(12) United States Patent
Tekawade

(10) Patent No.: US 6,838,802 B2
(45) Date of Patent: Jan. 4, 2005

(54) BRUSH HOLDER FOR DYNAMOELECTRIC MACHINES

(75) Inventor: Avinash M. Tekawade, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/324,557

(22) Filed: Dec. 19, 2002

(65) Prior Publication Data

US 2004/0119370 A1 Jun. 24, 2004

(51) Int. Cl.[7] .............................................. H02K 13/00
(52) U.S. Cl. ...................................... 310/239; 310/241
(58) Field of Search ................................ 310/239, 240, 310/241, 242

(56) References Cited

U.S. PATENT DOCUMENTS

| | | | | |
|---|---|---|---|---|
| 1,465,709 A | * | 8/1923 | Chandeysson | 310/239 |
| 1,764,709 A | * | 6/1930 | Anderson | 310/240 |
| 3,480,813 A | * | 11/1969 | Sillano | 310/241 |
| 4,823,037 A | * | 4/1989 | Abukawa et al. | 310/230 |

* cited by examiner

Primary Examiner—Dang Le
Assistant Examiner—Nguyen Hanh

(57) ABSTRACT

A brush holder (100) for carrying a brush (102) and for providing adjustment of the brush relative to the commutator (104) of a dynamoelectric machine (105). The brush holder provides for adjustment of the gap (110) between the commutator and the brush, and for adjustment of the brush in the axial direction along the commutator. The brush holder also locks the brush at the desired position for operation in the dynamoelectric machine.

16 Claims, 7 Drawing Sheets

US 6,838,802 B2

BRUSH HOLDER FOR DYNAMOELECTRIC MACHINES

FIELD OF THE INVENTION

The present invention relates generally to a brush holder for use with a brush assembly for a dynamoelectric machine, and more specifically to an adjustable brush holder for providing adjustment of the brush orientation with respect to the commutator.

BACKGROUND OF THE INVENTION

Generator action is employed in an electrical generator to produce an electrical output current from one or more stator windings. Conventionally, a generator comprises at least one stator winding carried on a stator core and a rotor shaft carrying a rotating field winding. Current is supplied to the rotating field winding from an exciter, as described further below, for creating a magnetic flux field that rotates within the stator core. One end of the rotor shaft is drivingly coupled to a steam or gas driven turbine for providing rotational energy to the rotor shaft and thus to the rotating field winding. The opposing end of the rotor shaft is coupled to the exciter. The rotating magnetic field induces current flow in the stator windings as the rotating field winding cuts across the stator windings. Single phase AC is supplied from a single stator winding. If the stator comprises three independent stator windings spaced at 120° intervals around the stator core, the stator output is three-phase alternating current. The exciter provides direct current (DC) to the rotating field winding of the generator. Like the main generator, the exciter employs generator action to develop the DC output. The exciter DC output is regulated to control the intensity of the magnetic field developed by the main generator field winding. Since the stator winding is responsive to this magnetic field, the main generator AC output current is thus controlled by the DC input to the rotating field winding.

In one embodiment, a so-called brushless exciter, the exciter comprises a rotating winding situated on the same turbine-driven shaft as the main generator, and a stationary field winding responsive to an externally-generated DC current. As the exciter winding rotates through the stationary magnetic field of the field winding, an AC current is induced in the former. The AC is converted to DC by a rectifier bridge mounted on the rotating shaft, and the resulting DC current is supplied to the generator field winding through conductors also mounted on the rotating shaft.

A brush and slip ring exciter 10 is illustrated in FIG. 1, comprising a rotating armature 12 carrying armature windings 13 and a stationary stator 14 carrying stator windings 15. DC power is supplied from a power supply 16 to the stator windings 15, for creating a stationary magnetic field, where reference character 18 identifies field lines of the stationary magnetic field. Generator action produces a current in the armature windings 13 as the stationary magnetic field lines cut the armature windings 13. The armature winding current is carried over conductors 22 to a commutator 24, comprising two commutator segments 24A and 24B. Brushes 26A and 26B in physical contact with the commutator segments 24A and 24B, respectively, carry the current over conductors 30 and 32 to a second set of brushes 34 and 36. The brush 34 carries the current on the conductor 30 to an input winding 40 of the generator rotor field winding 42 via a slip ring 44. The brush 36 carries the current on the-conductor 32 to an input winding 46 of the generator rotor field winding 42 via a slip ring 48. As described above, a turbine (not shown in FIG. 1) imparts rotation to the generator rotor field winding 42, thus inducing current in the stationary stator windings (not shown in FIG. 1) of the generator.

It is noted that AC current is produced in the armature windings 13 and is rectified to DC by the action of the commutator 24. Consider a shaded side 60 and an unshaded side 62 of the rotating armature 12 as indicated in FIG. 1. As the shaded side 60 cuts through the magnetic field created by the stator windings 15, current flows in a direction indicated by the arrowheads 64. That is, current flows from the unshaded side 62 toward the shaded side 60. At this point in the rotational cycle of the rotating armature 12, the brush 26B is in electrical communication with the shaded side 60 and the brush 26A is in electrical communication with the unshaded side 62. Thus current flows from the armature windings 13 to the brush 26B, through the conductor 32, to the brush 36 and the slip ring 48 to the input winding 42 of the generator rotor field winding 42. The return current flows from the input winding 40 through the slip ring 44 and the brush 34, through the conductor 30 to the brush 26A and the commutator segment 24A and back to the rotating armature 12.

As the rotating armature 12 rotates through 180° due to the rotational energy supplied by the turbine (not shown), current is induced to flow in the opposite direction through the armature windings 13. See FIG. 2. Current flows from the shaded side 60 to the unshaded side 62 of the rotating armature 12, to the commutator segment 24A, the brush 26A and follows the conductive path indicated by arrowheads 70. Note that the current flows in the same direction through the generator rotor field winding 42 in both the FIG. 1 and the FIG. 2 orientations. Thus the commutator 24 effects a rectification of the AC current flowing from the armature windings 13.

Brushes, such as the brushes 26A/B and the brushes 34/36 described above, are commonly used in dynamoelectric machines (i.e., motors and generators) in conjunction with a commutator or with slip rings as illustrated in FIGS. 1 and 2. The material of the brushes should provide good electrical conductivity and a long-life to avoid the need for frequent brush replacement. Also, the material should be relatively soft compared with the material of the rotating commutator against which the brushes are in physical contact. Use of a relatively soft material causes the replaceable brush to wear, rather than the commutator. Typically, the brushes are formed from carbon, graphite or an alloy of copper and carbon. In some applications a plurality of brushes are connected in an electrical parallel orientation to provide higher current capacity.

The brushes are held in place against the commutator by a brush holder mounted on the frame of the dynamoelectric machine and electrically insulated there from. Conventionally, the brush holder includes a spring associated with each brush for supplying a constant force to hold the brush against the commutator. However, since the bushes wear as the commutator rotates and eventually must be replaced, a brush holder providing efficient and rapid brush replacement is desired. Also, in certain dynamoelectric machines, brush adjustment and replacement can be performed only when the machine is not in operation. Thus a brush holder that allows rapid brush replacement limits machine downtime.

Accurate brush position relative to the rotating commutator is required for maximum commutation action and minimum brush wear. The brush must be set at a distance from the commutator that minimizes brush wear while providing good electrical contact between the brush and the commutator. The brush must not exert an undue force on the commutator, which would create excess friction and rapid brush wear. However, an insufficient contact force creates a gap between the brush face and the commutator. The gap introduces excess resistance into the brush circuit and arcing between the brush and the commutator, leading to premature brush wear.

It is also important to control the position of the brush axially along the commutator. For single ring commutators and slip rings, the brush should be positioned approximately at the center of the commutator or ring. For commutators having multiple adjacent rings, the brush should be positioned at the ring center to avoid contact with adjacent rings and the brushes associated therewith.

BRIEF SUMMARY OF THE INVENTION

It is desired to provide a brush holder for a dynamoelectric machine that allows proper positioning of the brush relative to the commutator, easy brush replacement and minimal brush wear. The brush holder of the present invention comprises a first adjustable element for positioning the brush axially along the commutator and a second adjustable element for adjusting the gap distance between the brush and the commutator surface. A third adjustable element locks the brush in the position determined by the second adjustable element. The brush holder is easily removable from the machine for brush replacement. Both removal/replacement of the brush holder and adjustment of the brush position can be accomplished during machine operation.

BRIEF DESCRIPTION OF THE DRAWINGS

These and other advantages of the invention will be more apparent from the following description in view of the drawings that show.

DETAILED DESCRIPTION OF THE INVENTION

Figure 3:
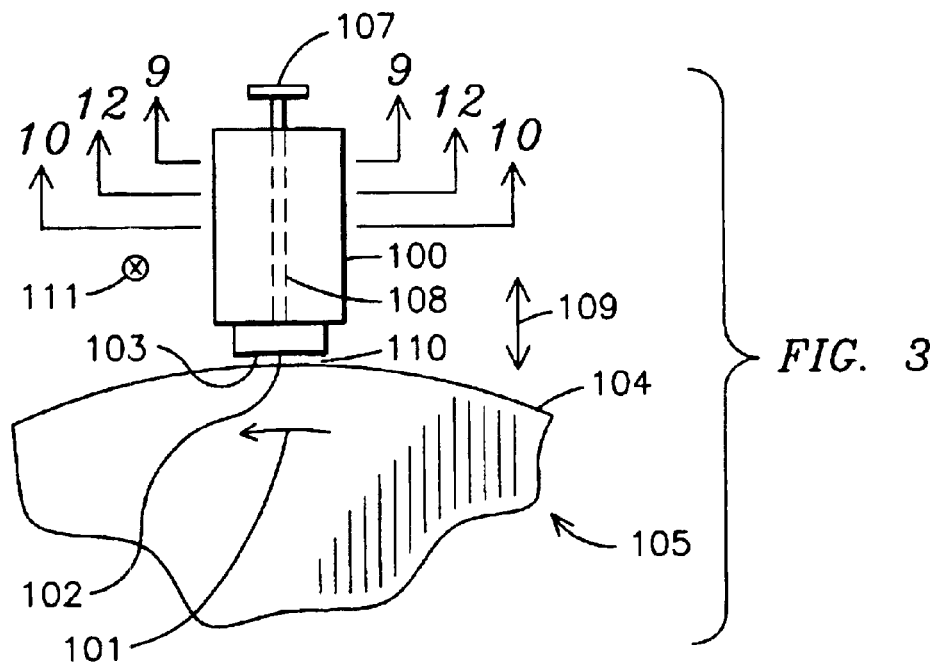
FIG. 3 illustrates a brush holder according to the teachings of the present invention relative to a commutator of the dynamoelectric machine.

A brush holder 100 constructed according to the teachings of the present invention is illustrated generally in the axial view (i.e., along the axis of rotation 101 of the commutator) of FIG. 3. A brush 102 extends from the brush holder 100, such that a brush face 103 is proximate a commutator 104 (which functions in a similar manner to the commutator 24 of FIG. 1) of a dynamoelectric machine 105. The position of the brush 102 relative to the commutator 104 is adjustable by user operation of a handle 107, causing rotation of plurality of cams (not shown in FIG. 3) carried on a cam shaft 108 for performing the aforementioned brush adjustments. Generally, these brush adjustments provide axial adjustment of the brush 102 parallel to the axis of rotation of the commutator 104 and gap adjustment, i.e., adjusting the distance between the brush face 103 and the commutator 104.

The brush holder 100 provides for adjustment of a gap distance 110 to optimize current flow and brush life. Arrowheads 109 in FIG. 3 indicate the adjustment of the brush 100 in this direction perpendicular to the axis of rotation. Also, the position of the brush 102 axially along the commutator 104 (i.e., into and out of the plane of the paper) as indicated by an arrow tail 111 is adjustable by the brush holder 100. In certain applications the commutator comprises a plurality of axially adjacent commutator rings, with one brush centered over each ring. The adjacent brushes are electrically connected in parallel to increase the current carrying capacity of the machine 105. Thus adjustment of the brush position in the direction of the arrow tail 111 allows the alignment of each brush with the center of each ring.

Figures 1, 2:
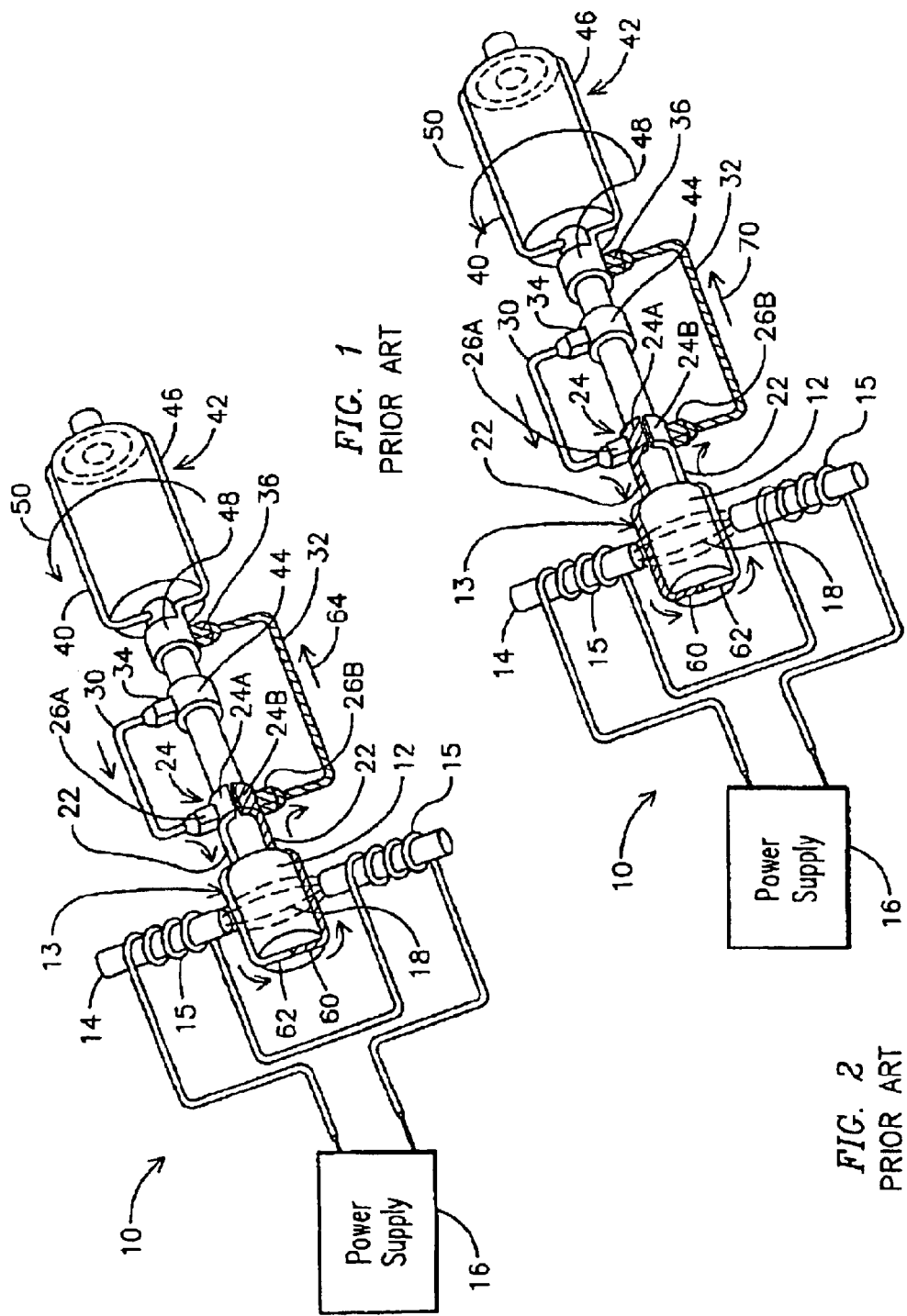
FIGS. 1 and 2 illustrate a dynamoelectric machine to which the teachings of the present invention can be applied.
Figure 4:
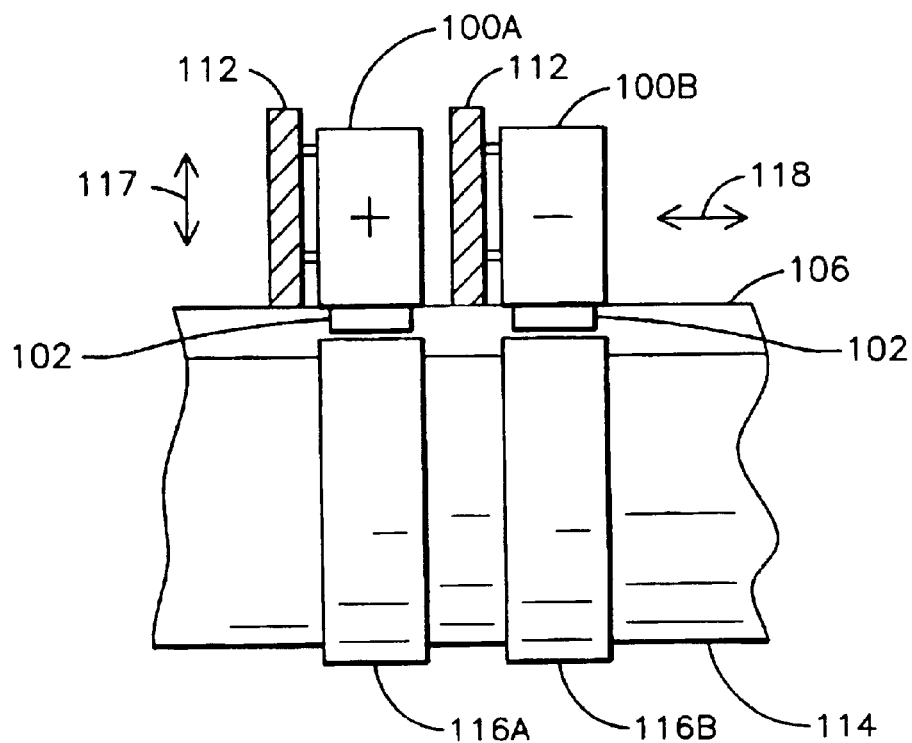
FIG. 4 illustrates a brush holder according to the teachings of the present invention relative to slip rings of a dynamoelectric machine.

In addition to the use of the brush holder 100 in conjunction with the commutator 104, the brush holder 100 can be used in conjunction with slip rings, such as the slip rings 44 and 48 of FIG. 1, for supplying current to or receiving current from a rotating device. In this application the brush holder 100 is adjustable to control the distance between the brush face 103 and the slip ring 44 or 48, and also to adjust the brush position axially along the slip ring. As is the case with commutators, in certain applications a plurality of brushes are oriented in a parallel configuration to increase the current carrying capacity of the slip ring. A rotating shaft 114 carrying slip rings 116A and 116B is illustrated in FIG. 4. In this application, each slip ring is electrically connected to a conductor (not shown) mounted on the shaft 114, similar to the operation of the slip rings 44 and 48 of FIG. 1. Thus the brush 102 carried by the brush holder 100A is designated the positive brush representing current flow through the brush 102 in a first direction, and the brush 102 carried by the brush holder 100B is designated the negative brush, indicating current flow through the brush 102 in a second direction. As shown, each brush holder 100A and 100B is connected to a brush bracket 112 (also referred to as brush rigging) to be described further below. Adjustment of the brushes in FIG. 4 by the brush holders 100A and 100B constructed according to the teachings of the present invention is effected in the directions identified by the arrowheads 117 (adjusting the distance between the brush face 103 and the facing surface of the slip rings 116A and 116B) and by the arrowheads 118 (axially along the slip rings 116A and 116B).

Figure 5:
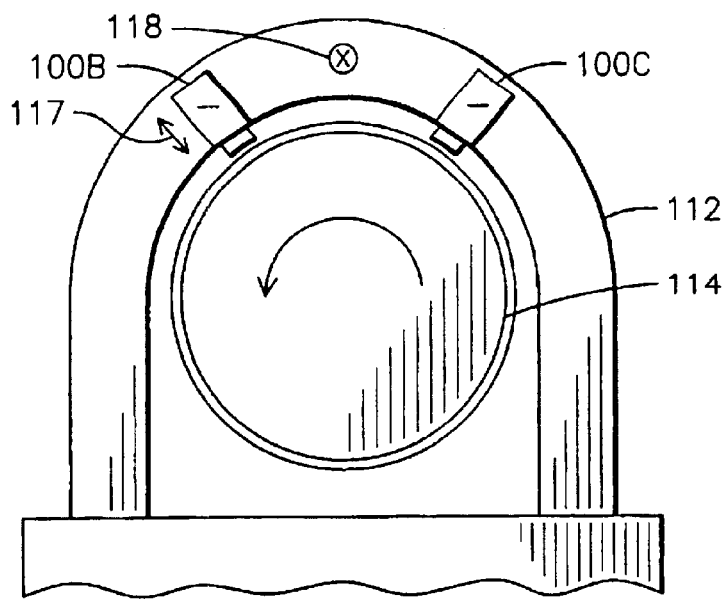
FIG. 5 illustrates a brush bracket for attaching a brush holder.

A side or end view of the FIG. 4 embodiment is illustrated in FIG. 5, where the brush holder 100B is shown attached to the brush bracket 112, which as can be seen, surrounds the dynamoelectric machine comprising the slip rings 116A and 116B. In this embodiment a plurality of parallel connected brushes 102 contact each slip ring 116A and 116B, with brush holders 100B and 100C, each carrying a brush 102, illustrated. The arrowhead 117 and 118 indicate the direction of brush adjustment provided by the brush holders 100B and 100C, that is axial adjustment (as indicated by the arrowheads 118) and adjustment of the gap distance 110 (as indicated by the arrowheads 117).

Figure 6:
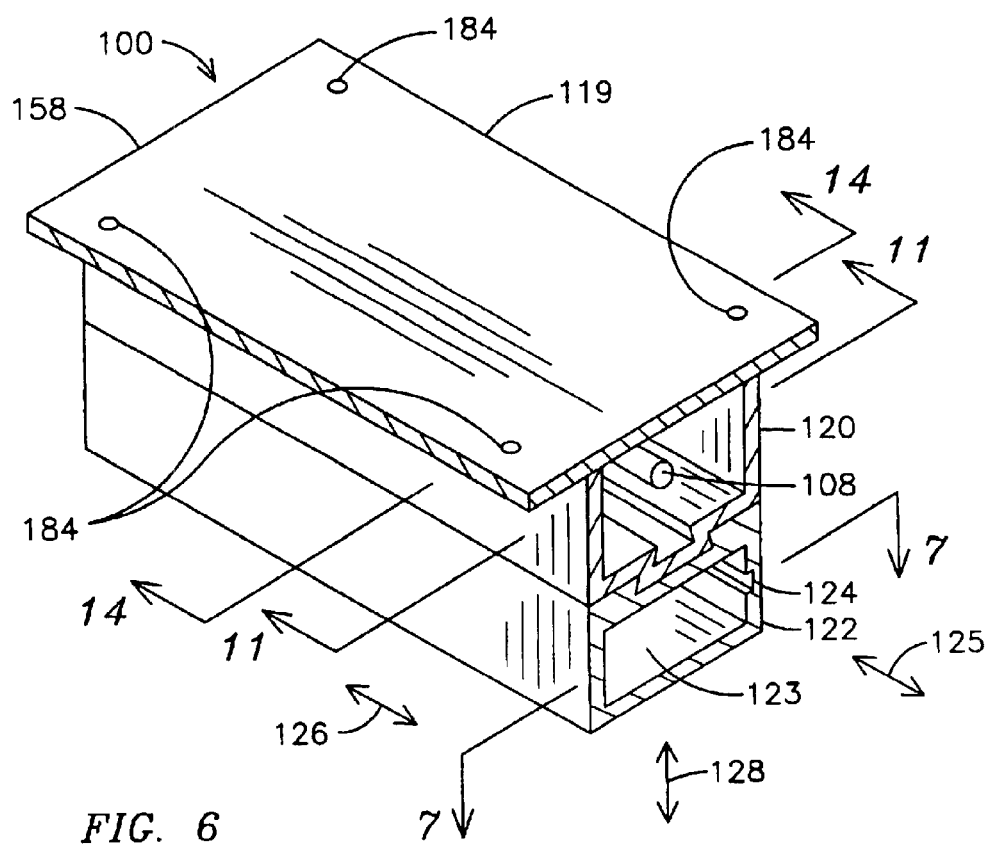
FIG. 6 is a perspective view of a brush holder constructed according to the teachings of the present invention.

FIG. 6 is a perspective view of the brush holder 100 (absent the handle 107) including a plate 119, a cam enclosure 120 for carrying the cam shaft 108, and a brush enclosure 122, where the brush 102 is slidably engaged in the opening 123 of the brush enclosure 122. The term enclosure is used with respect to the brush enclosure 122 and cam enclosure 120 to describe structures that provide support along at least two perpendicular axes, but the term should not be construed as being limited to the particular structures illustrated herein. A notch 124 receives a coil spring (not shown) for applying a constant force to the brush (not shown) in the direction of the arrowhead 125, thereby urging the brush 102 toward the commutator 104 or the slip rings 116, as described further below in conjunction with FIG. 7. The plate 119 is attached to the machine frame via the brush bracket 112 (as seen in FIG. 4), thus establishing the position of the cam enclosure 120 relative to the commutator 104. As will be described more fully below, the brush enclosure 122 is slidably engaged with the cam enclosure 120 by a keyway joint or other suitable mechanism to allow movement of the brush enclosure 122 relative to the cam enclosure 120 and machine frame along the axis of arrowhead 125.

According to the teachings of the present invention, the brush enclosure 122 is adjustable in the radial direction to control the gap distance 110 between the brush face 103 and the commutator 104 or the slip rings 116, as indicated by arrowheads 126. The cam enclosure 120 is further adjustable in the axial direction, as indicated by arrowheads 128, to adjust the brush 102 axially along the surface of the commutator 104 or the surface of the slip rings 116, as illustrated in FIG. 4. Adjustments in the direction of the arrowheads 126 and 128 are effected by rotation of the cam shaft 108 as discussed further below.

Figure 7:
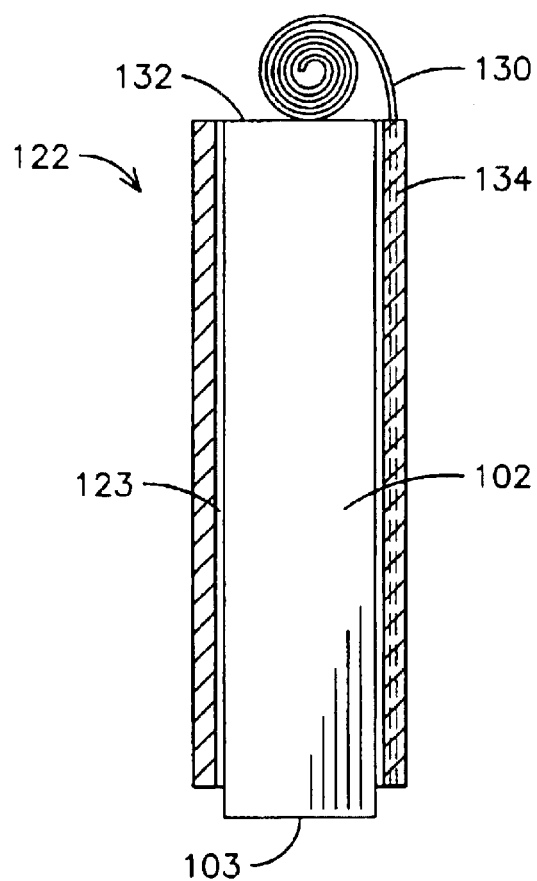
FIG. 7 is a cross-sectional view of a brush.

FIG. 7, a cross section through the plane 7—7 of FIG. 6, illustrates the brush 102 positioned within the opening 123, and further illustrates a coiled spring 130 positioned above a surface 132. An arm 134 extending from the coil spring 130 is disposed within the notch 124 of the brush enclosure 122. The coiled spring 130 applies a constant force against the surface 132, thereby urging the face 103 against the commutator 104 or the slip rings 116, dependent on the particular application of the brush holder 100. The range of motion of spring 130 is somewhat limited and the amount of radial force exerted by the spring 130 is somewhat variable along that range of motion. Adjustment of the position of the brush enclosure 122 relative to the cam enclosure 120 is useful for maintaining spring 130 within a smaller range of motion as brush 102 wears along surface 103.

Figure 8:
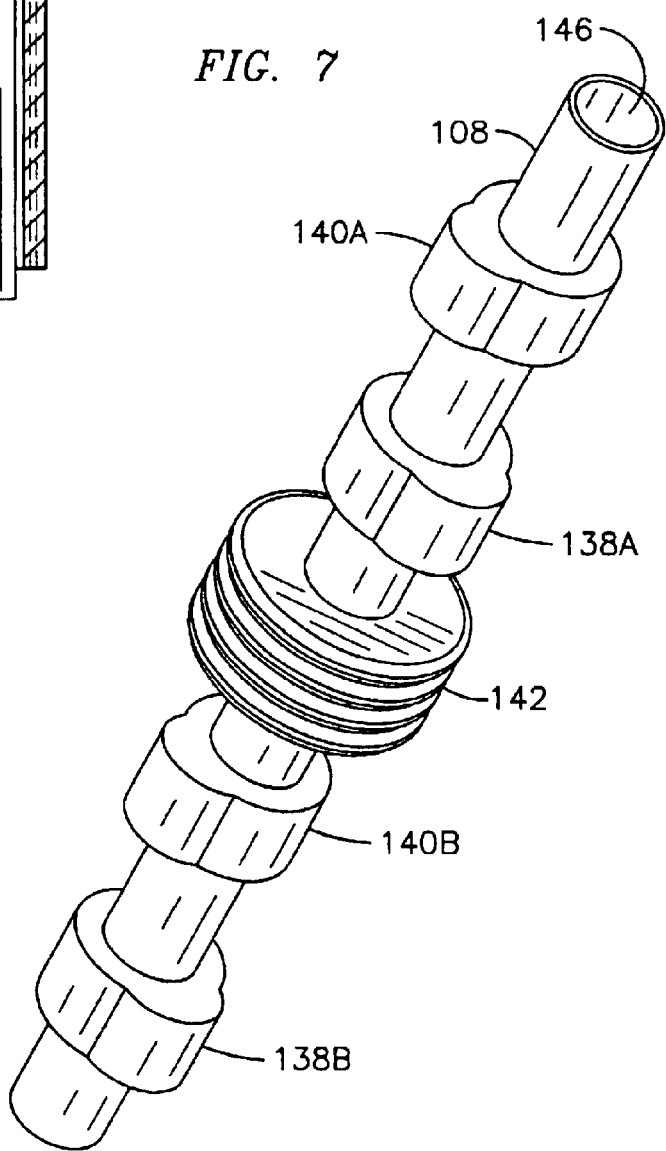
FIG. 8 is a perspective view of a cam shaft for adjusting the brush position.

FIG. 8 illustrates the cam shaft 108, including cams 138A and 138B, cams 140A and 140B and a gear 142, for effecting adjustment of the brush 102 according to the teachings of the present invention. In particular, the cams 138A/B adjust the brush position axially along rotational axis of the commutator 104 or slip rings 116. The gear 142 adjusts the radial gap distance 110. The cams 140A/B lock the brush 102 in position after the desired gap distance has been achieved. Cam shaft 108 is rotatably supported within cam enclosure 120. The specific mechanism by which the cams and gear interact with the brush enclosure 122 to effectuate the aforementioned adjustments are described below. The cams 138A/B and 140A/B and the gear 142 are independently rotatable relative to the cam shaft 108 and with respect to each other.

In another embodiment, more or fewer than two cams 138A/B and 140 A/B can be utilized to perform the adjusting and locking functions. Likewise two or more gears 142 can perform the adjustment of the gap distance 110.

Figure 9:
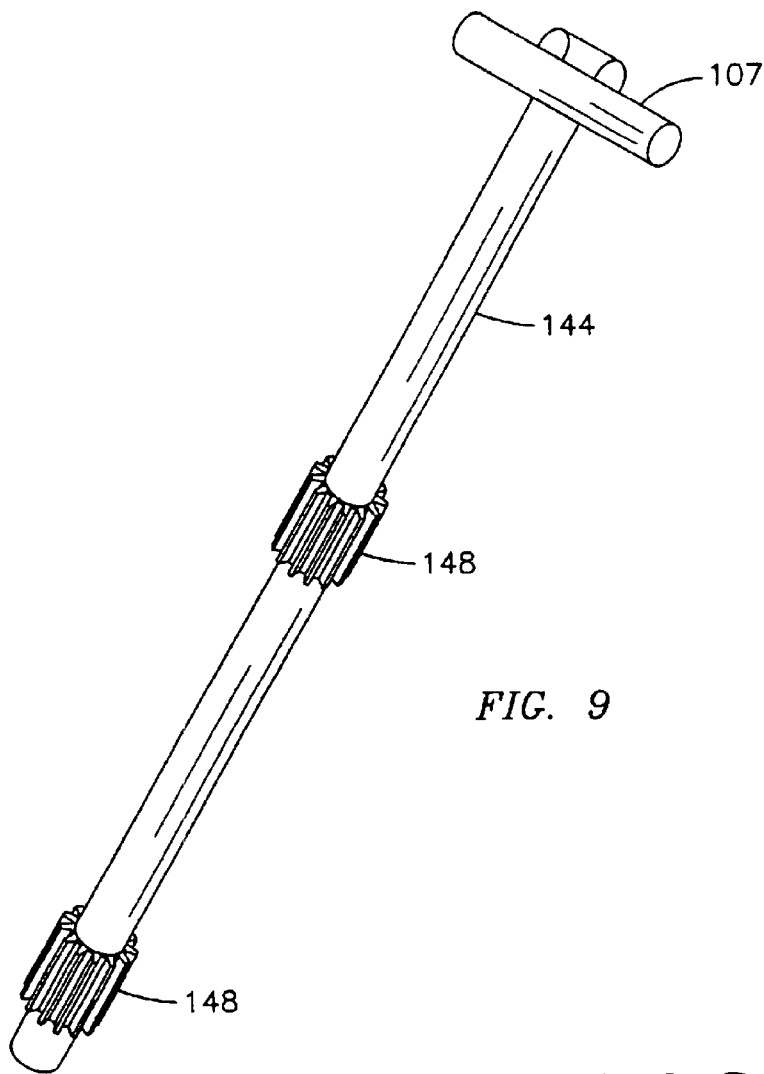
FIG. 9 is a perspective of a spline shaft for removably engaging the cam shaft of FIG. 8.

FIG. 9 illustrates a spline shaft 144 for slidable engagement into a bore 146 (see FIG. 8) of the cam shaft 108. The spline shaft 144 carries two spline regions 148 for engaging mating gear teeth within an interior surface of the cams 138A/B, the cams 140A/B and the gear 142, as the spline shaft 140 is slidably telescoped within the bore 146. To rotate the cams 138A/B to effect axial displacement of the brush 102, the spline shaft 144 is first positioned within the bore 146 by axial movement of the handle 107, such that the spline regions 148 engage interior mating gear teeth of the cams 138A/B. The handle 107 is then rotated to set the plurality of cams 138A/B in the desired position such that the brush 102 is properly aligned along the commutator axis of rotation.

To rotate the cams 140A/B to lock the brush 102 in position, the spline shaft 144 is positioned within the bore 146 by axial movement of the handle 107 to engage the interior mating gear teeth of the cams 140A/B. The handle 107 is then rotated to set the cams 140A/B in position to lock the brush 102 in the brush holder 100, thereby preventing further brush movement.

To adjust the radial gap distance 110 (see FIG. 3), either one of the two spline regions 148 is mated with interior mating gear teeth of the gear 142 by telescoping motion of the spline shaft 144 in response to user operation of the handle 107. The handle 107 is then rotated to effectuate movement of the brush 102 toward or away from the surface of the commutator 104 by causing relative sliding motion between the cam enclosure 120 and the brush enclosure 122.

Figure 10:
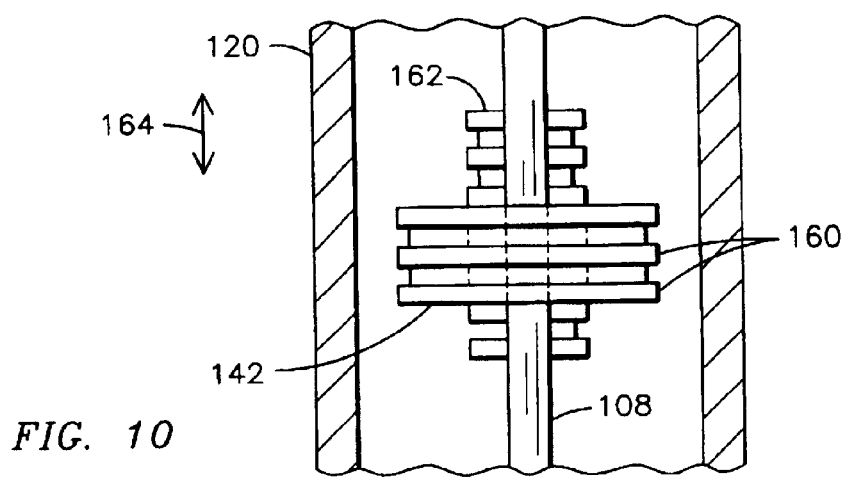
FIGS. 10 and 11 illustrate the operation of certain cams and a gear of the cam shaft of FIG. 8 for adjusting the brush position.

FIG. 10 is an interior view of the brush holder 100 in the region indicated by reference character 158 of FIG. 6, which represents the region of the gear 142 illustrated in FIG. 8. Gear teeth 160 of the gear 142 engage corresponding gear teeth 162 formed on an inside surface of the brush enclosure 122 for adjusting the brush position by rotation of the handle 107. A separate gear or gearbox may be provided in lieu of forming gear teeth 162 directly on the brush enclosure 122. Brush movement is effected in a direction indicated by arrowheads 164 in the FIG. 10 orientation to adjust the radial gap distance 110 as desired. The approximate range of brush adjustment provided in one embodiment is about 0.1 to 0.3 inches.

Figure 11:
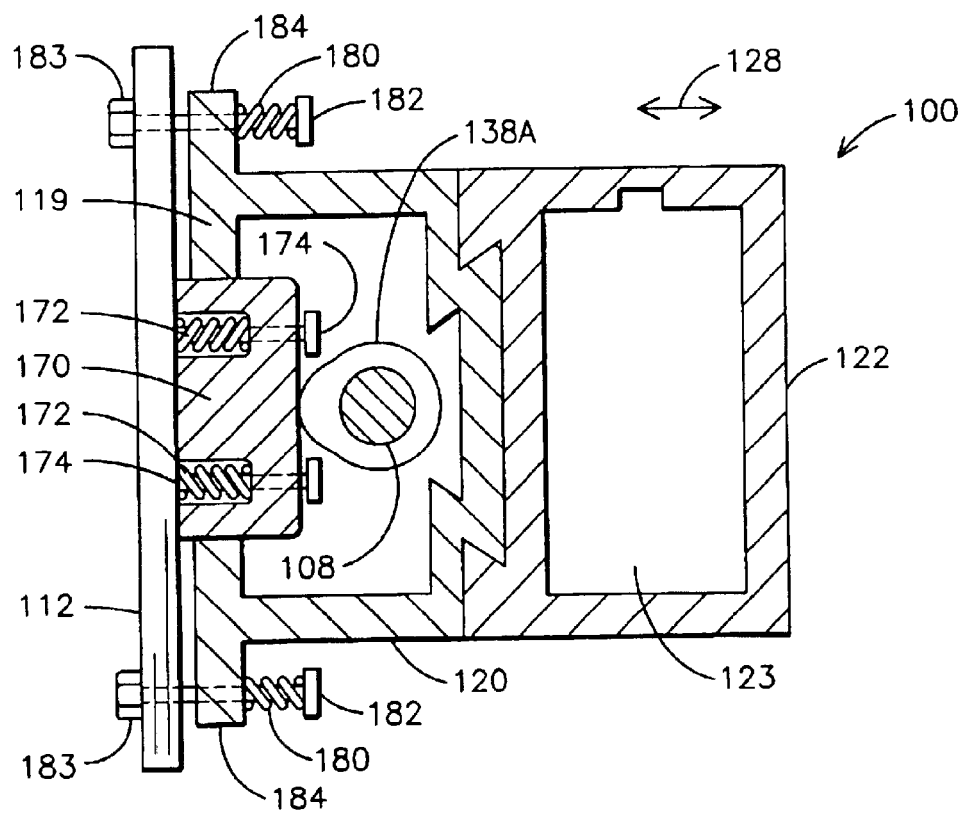

FIG. 11 illustrates the cam arrangement for axial adjustment of the brush position, as indicated by the arrowheads 128. The FIG. 11 cross-section is taken along the line 11—11 of FIG. 6, in the region of either cam 138A or 138B. In this region, the brush holder 100 further comprises a pad 170 biased against the brush bracket 112 by the action of springs 172 concentrically mated with pins 174 passing through the pad 170 as shown. As the cams 138A and 138B are rotated (only the cam 138A is illustrated in FIG. 11) by operation of the handle 107, the force applied by the cam 138A against the pad 170 is changed, allowing the force supplied by the springs 172 to move the brush holder 100 toward or away from the brush bracket 112, in the direction of the arrowheads 128. A locking mechanism (not shown) may be provided to maintain cams 138A and 138B in a desired position. A back bias force on the brush holder 100 is provided by springs 180 concentrically mated with pins 182 passing through holes 184 in the plate 119 (see also FIG. 6), wherein the pins 182 are demountably affixed to the brush bracket 112 with a capturing mechanism 183, such as a threaded nut for use in an embodiment wherein the pins 182 comprise a threaded structure. In lieu of the pins 182, any elongated structure concentrically mated with a spring can supply the back bias force. Typically, the range of adjustment provided by rotation of the cams 138A/B is about 3 to 10 millimeters.

Figure 12:
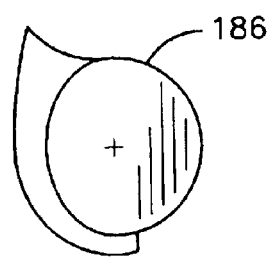
FIGS. 12 and 13 illustrate exemplary cams for use with the cam shaft of FIG. 8.
Figure 13:
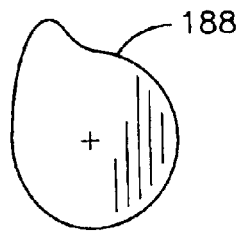

FIGS. 12 and 13 illustrate other exemplary cams 186 and 188, having a different cam profile than the cams 138A/B. The range of brush adjustment and the relationship between rotation of the cam shaft 108 and brush motion is affected by the cam profile. Thus cams having other profiles, such as the cams 186 and 188, can be used in lieu of the cams 138A/B to effect a different adjustment range and/or a different adjustment profile.

Figure 14:
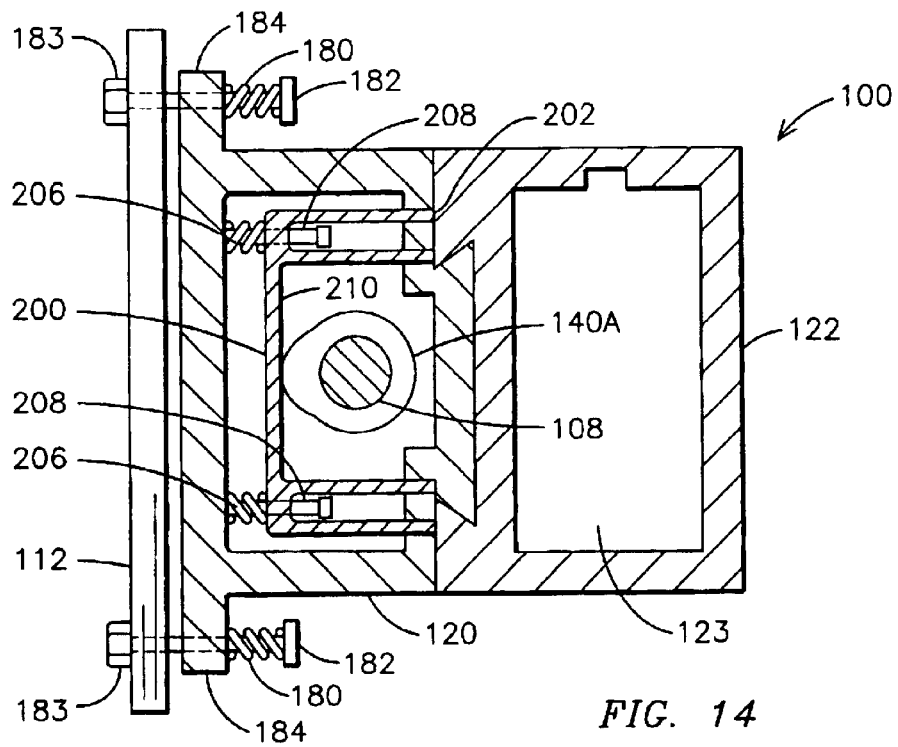
FIG. 14 illustrates the operation of certain cams of the cam shaft of FIG. 8 for adjusting the brush position.

FIG. 14 illustrates the cam arrangement for locking the radial position of the brush holder 100 after completion of the gap distance adjustment. The FIG. 14 cross-section is taken along the line 14—14 of FIG. 6, i.e., in the region of either cams 140A or 140B. As the cams 140A and 140B are rotated (only the former is illustrated in FIG. 14) by operation of the handle 107, a spring-loaded pad 200 is urged against a surface 202 of the brush enclosure 122, preventing movement of the brush enclosure 122 relative to the cam enclosure 120. The bias force on the pad 200 is provided by springs 206 concentrically mated with pins 208. As the cam 140A is rotated away from a surface 210, the springs 206 supply a force against the surface 202, constraining movement of the brush enclosure 122, and thus the brush 102 in a direction perpendicular to the plane of the paper. When making a radial adjustment of the position of brush holder 122, cam 140A is rotated toward surface 210, thus forcing pad 200 away from surface 202 to permit relative movement there between.

The many advantages of the brush holder 100 can now be appreciated. Adjustment of the brush 102 in two directions relative to the commutator 104 or slip rings 116 allows precise positioning of the brush 102. Once positioned, the brush 102 is then locked in place. The adjustments and the locking function are performed with a single user-operated brush handle 107. The handle 107 can be removed from the brush holder 100 when not in use or can remain stored within the bore 142.

Figure 15:
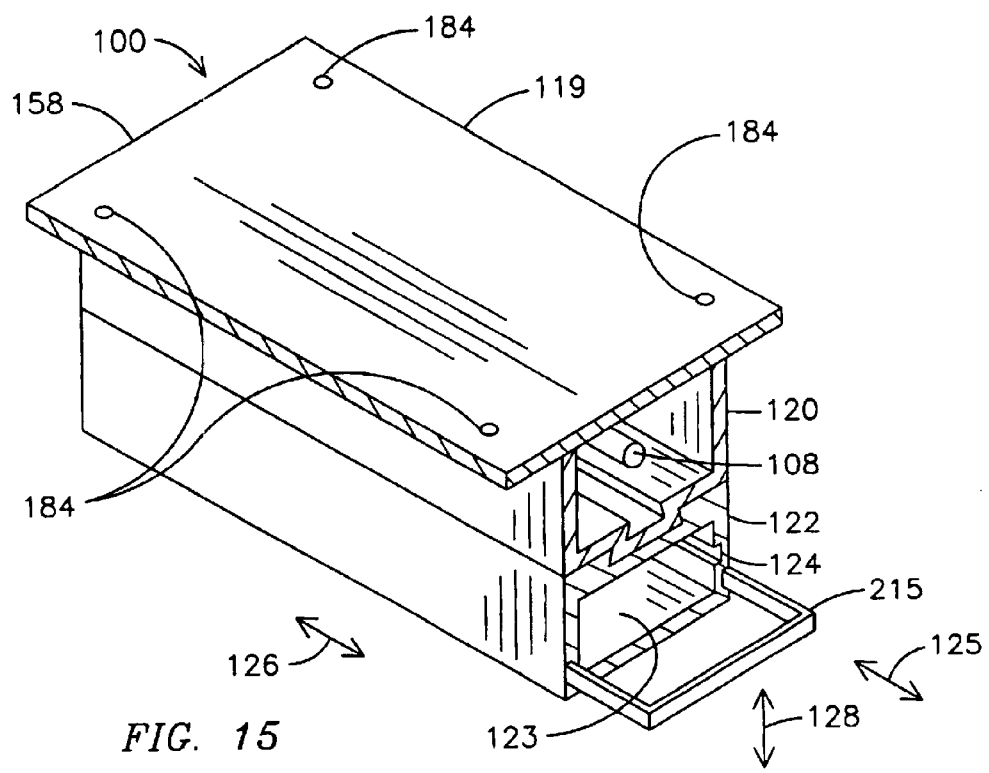
FIG. 15 is a perspective view of a second embodiment of a brush holder according to the teachings of the present invention.

To remove the brush holder 100 after disengagement from the brush bracket 112, in another embodiment as illustrated in FIG. 15, a handle 215 is affixed to the brush enclosure 122.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. In a dynamoelectric machine having a shaft rotating within a frame along an axis, a rotating conductive element affixed to the shaft and a stationary brush in current-carrying relationship with the rotating conductive element, a brush holder comprising:

an enclosure supporting the brush;

a spring bias urging the enclosure in a first axial direction;

an axial positioning element supporting the enclosure, for providing a range of selectable axial positions relative to the frame, further comprising:

a pad spring biased in a second axial direction opposing the first axial direction;

a cam rotatably supported by the enclosure and engaging the pad to maintain a position of the enclosure relative to the pad; and wherein the relative axial position of the brush to the frame is responsive to a rotational position of the cam relative to the enclosure.

2. The brush holder of claim 1 further comprising a radial positioning element supporting the enclosure along a range of selectable radial positions relative to the frame.

3. In a dynamoelectric machine having a shaft rotating within a frame along an axis, a rotating conductive element affixed to the shaft and a stationary brush in current-carrying relationship with the rotating conductive element, a brush holder comprising:

an enclosure supporting the brush;

a first gear element attached to the frame; and a second gear element attached to the enclosure and engaging the first gear element;

wherein the relative radial position of the brush to the frame is responsive to relative rotation between the first gear element and the second gear element.

4. A dynamoelectric machine comprising:

a frame;

a shaft rotatably supported along an axis within the frame;

a rotating conductive element affixed to the shaft;

a brush in current-carrying relationship with the rotating conductive element;

a radial brush holding means for supporting the brush along a range of selectable radial positions relative to the frame; and an axial brush holding means for supporting the brush along a range of selectable axial positions relative to the frame.

5. A brush holder for a dynamoelectric machine comprising a rotating shaft and a rotating conductive element affixed thereto, and further comprising a brush in current-carrying relationship with the rotating conductive element, the brush holder, comprising:

a brush enclosure for carrying the brush such that a brush face is proximate the rotating conductive element;

a first positioning element for positioning the brush on the rotating conductive element in the direction of the axis of rotation of the rotating conductive element;

a second positioning element for adjusting the distance between the rotating conductive element and the brush face; and a locking element for locking the brush in the position determined by the second positioning element.

6. The brush holder of claim 5 wherein the rotating conductive element is selected from among a commutator and slip rings.

7. The brush holder of claim 5 further comprising a cam enclosure and a user-rotatable cam shaft within the cam enclosure, wherein the cam shaft defines an axial opening therein, and wherein the first and the second positioning elements and the locking element are carried on the outside surface of the cam shaft, and wherein rotation of the cam shaft displaces the first and the second positioning elements for positioning the brush and for engaging the locking element for locking the brush position.

8. The brush holder of claim 7 further comprising a spline shaft carrying a spline gear, wherein the spline shaft telescopes within the axial opening of the cam shaft, and wherein the cam shaft further comprises within the axial opening a first, a second and a third assembly of gear teeth affixed to the first and the second positioning elements and the locking element, respectively, and wherein to rotate the first positioning element the spline gear is brought into engagement with the first assembly of gear teeth such that the first positioning element is rotated in response to user-initiated rotation of the spline shaft, and wherein to rotate the second positioning element the spline gear is brought into engagement with the second assembly of gear teeth such that the second positioning element is rotated in response to user-initiated rotation of the spline shaft, and wherein to rotate the locking element the spline gear is brought into engagement with the third assembly of gear teeth such that the locking element is rotated in response to user-initiated rotation of the spline shaft.

9. The brush holder of claim 8 wherein the second positioning element comprises a fourth gear, and wherein the brush enclosure comprises a third assembly of gear teeth for mating with the fourth gear, and wherein engagement of the spline gear with the second assembly of gear teeth followed by user-initiated rotation of the spline shaft causes rotation of the fourth gear and corresponding displacement of the third assembly of gear teeth in response to which the distance between the rotating conductive element and the brush face is adjusted.

10. The brush holder of claim 8 wherein the first positioning element comprises a first cam for rotation in response to rotation of the spline shaft and for bearing against a surface of the cam enclosure to position the brush on the rotating conductive element along the axis of rotation of the rotating conductive element.

11. The brush holder of claim 10 movably affixed to a brush bracket, and wherein the brush bracket is rigidly affixed to the dynamoelectric machine, such that the surface of the cam enclosure is movable relative to the brush bracket.

12. The brush holder of claim 10 wherein the surface of the cam enclosure comprises a surface biased away from the brush bracket, and wherein the brush holder is biased toward the brush bracket, and wherein rotation of the first cam causes movement of the surface in response to the force exerted by the cam relative to the force exerted against the cam by the opposing biases.

13. The brush holder of claim 10 wherein the first cam comprises an irregular circumference.

14. The brush holder of claim 10 further comprising a second cam for rotation in response to the rotation of the spline shaft and for bearing against the surface of the cam enclosure to position the brush on the rotating conductive element along the axis of rotation.

15. The brush holder of claim 8 wherein the locking element comprises a third can for rotation in response to rotation of the spline shaft and for bearing against a surface of the cam enclosure to lock the position of the brush enclosure relative to the cam enclosure.

16. The brush holder of claim 15 wherein the surface of the cam enclosure comprises a first surface biased toward a second surface, and wherein the second surface is in contact with the brush enclosure via openings in the cam enclosure, and wherein rotation of the cam in a first direction increases the bias exerted against the second surface in response to which the force exerted against the brush enclosure locks the brush enclosure relative to the cam enclosure, and wherein rotation of the cam in a second direction decreases the bias exerted against the second surface and in response thereto the force exerted against the brush enclosure is deceased, thereby permitting adjustment of the distance between the rotating conductive element and the brush face in response to operation of the second positioning element.

* * * * *